(12) United States Patent
Ravi et al.

(10) Patent No.: US 11,841,295 B2
(45) Date of Patent: Dec. 12, 2023

(54) ASSET AGNOSTIC ANOMALY DETECTION USING CLUSTERING AND AUTO ENCODER

(71) Applicant: Honeywell International Inc., Charlotte, NC (US)

(72) Inventors: Vijay Kumar Ravi, Atlanta, GA (US); Jan Zirnstein, Atlanta, GA (US); Amit Pandey, Hyderabad (IN); Milad Makkie, Cumming, GA (US)

(73) Assignee: Honeywell International Inc., Charlotte, NC (US)

( * ) Notice: Subject to any disclaimer, the term of this patent is extended or adjusted under 35 U.S.C. 154(b) by 38 days.

(21) Appl. No.: 17/454,945

(22) Filed: Nov. 15, 2021

(65) Prior Publication Data

US 2022/0155184 A1 May 19, 2022

Related U.S. Application Data

(60) Provisional application No. 63/114,791, filed on Nov. 17, 2020.

(51) Int. Cl.
*G06F 11/30* (2006.01)
*G01M 99/00* (2011.01)
*G06F 16/28* (2019.01)

(52) U.S. Cl.
CPC ......... *G01M 99/005* (2013.01); *G06F 16/285* (2019.01)

(58) Field of Classification Search
CPC .................................................. G01M 99/005
See application file for complete search history.

(56) References Cited

U.S. PATENT DOCUMENTS

2018/0248904 A1* 8/2018 Villella .................. G06N 20/00
2020/0372024 A1* 11/2020 Kulkarni ............... G06F 16/901

* cited by examiner

*Primary Examiner* — Phuong Huynh
(74) *Attorney, Agent, or Firm* — Alston & Bird LLP

(57) ABSTRACT

Various embodiments described herein relate to an anomaly detection framework adaptable to different asset types. In this regard, a data stream associated with a first asset is received. The data stream is then processed to generate output data by encoding the data stream based on historical data associated with the first asset, the historical data comprising clustered data representative of fault states and one or more non-fault states. Furthermore, in accordance with a determination that the generated output data is indicative of a potential fault of the first asset, fault data indicative of the potential fault is generated and caused to be transmitted to an administrative device for display.

24 Claims, 8 Drawing Sheets

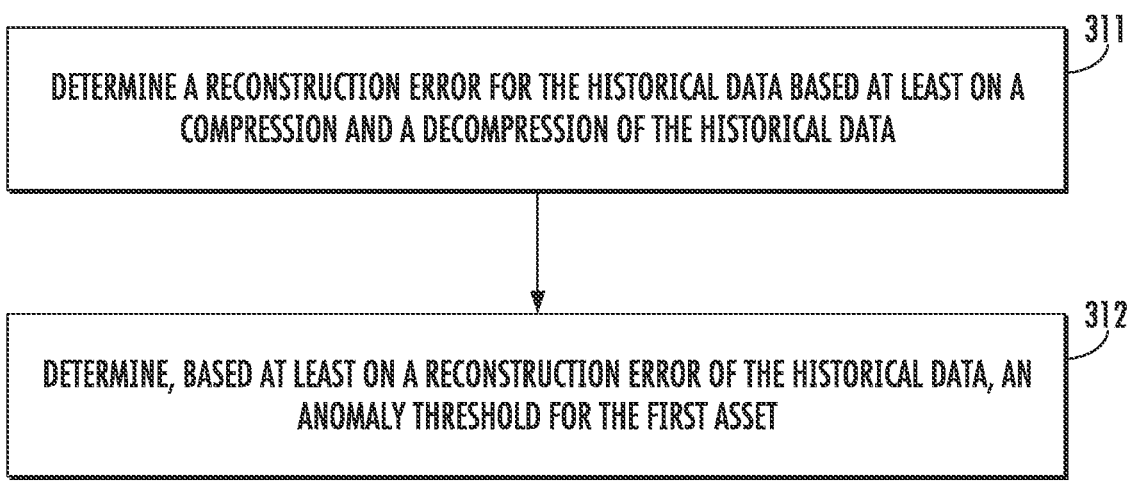

ASSET AGNOSTIC ANOMALY DETECTION USING CLUSTERING AND AUTO ENCODER

TECHNICAL FIELD

The present disclosure relates generally to anomaly detection, and more particularly to an anomaly detection framework adaptable to different asset types.

BACKGROUND

Various industries include a large amount of devices and/or equipment (e.g., compressors, boilers, and/or the like) at one or multiple locations, such as industrial plants. Such devices and equipment may be referred to as assets. Process control and automation systems are routinely used to automate large and complex industrial processes. The processes often include a large amount of assets, and each asset may fail or experience some other type of fault one or more times during its operational lifetime. In this regard, fault detection techniques may be used to detect faults or failures of the assets. However, such techniques are commonly asset-specific and designed to capture relationships between process variables for only a particular asset.

BRIEF SUMMARY

In accordance with some embodiments, a system is provided. The system includes a processor and a memory that stores executable instructions that, when executed by the processor, cause the processor to receive a data stream associated with a first asset. The executable instructions, when executed by the processor, also cause the processor to generate output data by processing the data stream, the processing comprising encoding the data stream based on historical data associated with the first asset, and the historical data comprising clustered data representative of fault states and one or more non-fault states. The executable instructions, when executed by the processor, also cause the processor to determine whether a generated output data is indicative of a potential fault of the first asset. In accordance with determining that the generated output data is indicative of a potential fault of the first asset, the executable instructions, when executed by the processor, also cause the processor to generate fault data indicative of the potential fault of the first asset. The executable instructions, when executed by the processor, also cause the processor to cause transmission of the fault data to an administrative device for display.

In some embodiments, the executable instructions, when executed by the processor, further cause the processor to generate the historical data by processing received sample data for the first asset. To process the received sample data for the first asset, the executable instructions, when executed by the processor, cause the processor to cluster the received sample data for the first asset into one or more data clusters, and further to determine a largest data cluster of the one or more data clusters, the historical data being based on the largest data cluster.

In some embodiments, the executable instructions, when executed by the processor, further cause the processor to receive a second data stream associated with a second asset. In response to receiving the second data stream, the executable instructions, when executed by the processor, further cause the processor to determine whether the second asset is associated with a same asset type as the first asset. In accordance with determining that the second asset is associated with the same asset type as the first asset, the executable instructions, when executed by the processor, further cause the processor to generate second output data by processing the second data stream, the processing encoding the second data stream based on the historical data associated with the first asset.

In some embodiments, in accordance with a determination that the generated second output data is indicative of a potential fault of the second asset, the executable instructions, when executed by the processor, further cause the processor to generate second fault data indicative of the potential fault of the second asset. The executable instructions, when executed by the processor, further cause the processor to cause transmission of the second fault data to the administrative device for display.

In some embodiments, the executable instructions, when executed by the processor, further cause the processor to determine a reconstruction error for the historical data based at least on a reconstructed representation of the historical data. The executable instructions, when executed by the processor, further cause the processor to determine, based at least on a reconstruction error of the historical data, an anomaly threshold.

In some embodiments, the executable instructions, when executed by the processor, further causing the processor to determine whether the generated output data exceeds the anomaly threshold, with the generated output data being determined to be indicative of the potential fault of the first asset in accordance with determining that the generated output data exceeds the anomaly threshold.

In some embodiments, in accordance with determining that the generated output data is not indicative of a potential fault of the first asset, the executable instructions, when executed by the processor, further cause the processor to, generate data indicative that the first asset is operating normally. The executable instructions, when executed by the processor, further cause the processor to cause transmission of the data indicative that the first asset is operating normally to the administrative device for display. In some embodiments, the fault data or the data indicative that the first asset is operating normally being further indicative of the anomaly threshold.

In accordance with some embodiments, a method is performed. The method includes receiving a data stream associated with a first asset. The method also includes generating output data by processing the data stream, the processing comprising encoding the data stream based on historical data associated with the first asset, and the historical data comprising clustered data representative of fault states and one or more non-fault states. The method also includes determining whether a generated output data is indicative of a potential fault of the first asset. In accordance with determining that the generated output data is indicative of a potential fault of the first asset, the method also includes generating fault data indicative of the potential fault of the first asset. The method also includes causing transmission of the fault data to an administrative device for display.

In some embodiments, the method also includes generating the historical data by processing received sample data for the first asset, the processing comprising clustering the received sample data for the first asset into one or more data clusters and determining a largest data cluster of the one or more data clusters, the historical data being based on the largest data cluster.

In some embodiments, the method also includes receiving a second data stream associated with a second asset. The method also includes, in response to receiving the second data stream, determining whether the second asset is associated with a same asset type as the first asset. The method also includes, in accordance with determining that the second asset is associated with the same asset type as the first asset, generating second output data by processing the second data stream, the processing encoding the second data stream based on the historical data associated with the first asset.

In some embodiments, the method also includes, in accordance with a determination that the generated second output data is indicative of a potential fault of the second asset, generating second fault data indicative of the potential fault of the second asset. The method also includes causing transmission of the second fault data to the administrative device for display.

In some embodiments, the method also includes determining a reconstruction error for the historical data based at least on a compression and a decompression of the historical data. In some embodiments, the method also includes determining, based at least on a reconstruction error of the historical data, an anomaly threshold for the first asset.

In some embodiments, the method also includes determining whether the generated output data exceeds the anomaly threshold, with the generated output data being determined to be indicative of the potential fault of the first asset in accordance with determining that the generated output data exceeds the anomaly threshold.

In some embodiments, the method also includes, in accordance with determining that the generated output data is not indicative of a potential fault of the first asset, generating data indicative that the first asset is operating normally. In some embodiments, the method also includes causing transmission of the data indicative that the first asset is operating normally to the administrative device for display. In some embodiments, the fault data or the data indicative that the first asset is operating normally being further indicative of the anomaly threshold.

In accordance with some embodiments, a non-transitory computer-readable storage medium is provided. The non-transitory computer-readable storage medium includes one or more programs for execution by one or more processors of a first device. The one or more programs include instructions which, when executed by the one or more processors, cause the device to receive a data stream associated with a first asset. The one or more programs also include instructions which, when executed by the one or more processors, cause the device to generate output data by processing the data stream, the processing comprising encoding the data stream based on historical data associated with the first asset, and the historical data comprising clustered data representative of fault states and one or more non-fault states. The one or more programs also include instructions which, when executed by the one or more processors, cause the device to determine whether a generated output data is indicative of a potential fault of the first asset. The one or more programs also include instructions which, when executed by the one or more processors, cause the device to, in accordance with determining that the generated output data is indicative of a potential fault of the first asset, generate fault data indicative of the potential fault of the first asset. The one or more programs also include instructions which, when executed by the one or more processors, cause the device to cause transmission of the fault data to an administrative device for display.

In some embodiments, the instructions, when executed by the one or more processors, further cause the device to generate the historical data by processing received sample data for the first asset. To process the received sample data for the first asset, the instructions, when executed by the one or more processors, further cause the device to cluster the received sample data for the first asset into one or more data clusters. The instructions, when executed by the one or more processors, further cause the device to determine a largest data cluster of the one or more data clusters, the historical data being based on the largest data cluster.

In some embodiments, the instructions, when executed by the one or more processors, further causing the device to receive a second data stream associated with a second asset. The instructions, when executed by the one or more processors, further cause the device to, in response to receiving the second data stream, determine whether the second asset is associated with a same asset type as the first asset. The instructions, when executed by the one or more processors, further cause the device to, in accordance with determining that the second asset is associated with the same asset type as the first asset, generate second output data by processing the second data stream, the processing encoding the second data stream based on the historical data associated with the first asset.

In some embodiments, the instructions, when executed by the one or more processors, further cause the device to, in accordance with a determination that the generated second output data is indicative of a potential fault of the second asset, generate second fault data indicative of the potential fault of the second asset. In some embodiments, the instructions, when executed by the one or more processors, further cause the device to cause transmission of the second fault data to the administrative device for display.

In some embodiments, the instructions, when executed by the one or more processors, further cause the device to determine a reconstruction error for the historical data based at least on a compression and a decompression of the historical data. In some embodiments, the instructions, when executed by the one or more processors, further cause the device to determine, based at least on a reconstruction error of the historical data, an anomaly threshold for the first asset.

In some embodiments, the instructions, when executed by the one or more processors, further cause the device to determine whether the generated output data exceeds the anomaly threshold, with the generated output data being determined to be indicative of the potential fault of the first asset in accordance with determining that the generated output data exceeds the anomaly threshold. In some embodiments, the instructions, when executed by the one or more processors, further causing the device to, in accordance with determining that the generated output data is not indicative of a potential fault of the first asset, generate data indicative that the first asset is operating normally. In some embodiments, the instructions, when executed by the one or more processors, further cause the device to cause transmission of the data indicative that the first asset is operating normally to the administrative device for display. In some embodiments, the fault data or the data indicative that the first asset is operating normally being further indicative of the anomaly threshold.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements.

Embodiments incorporating teachings of the present disclosure are shown and described with respect to the figures presented herein, in which:

FIG. 3B illustrates a flow diagram of operations related to determining an anomaly threshold, in accordance with one or more embodiments described herein;

DETAILED DESCRIPTION

Figure 1:
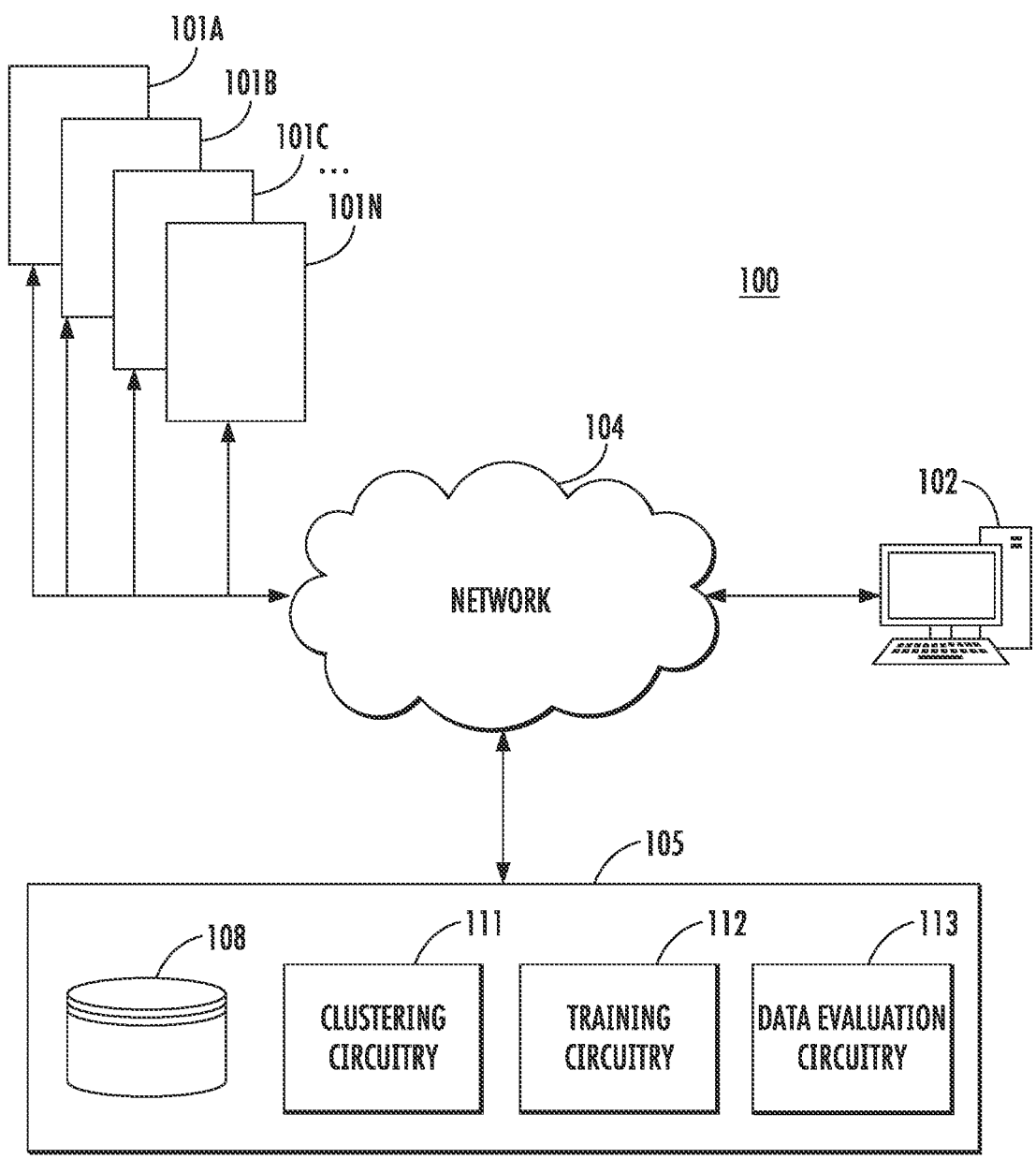
FIG. 1 illustrates a block diagram of a system configured to communicate via a network, in accordance with one or more embodiments described herein.

Various embodiments of the present invention now will be described more fully hereinafter with reference to the accompanying drawings, in which some, but not all embodiments of the invention are shown. Indeed, the invention can be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout. As used herein, the terms "data," "content," "information," "electronic information," "signal," "command," and similar terms may be used interchangeably to refer to data capable of being captured, transmitted, received, and/or stored in accordance with various embodiments of the present disclosure. Thus, use of any such terms should not be taken to limit the spirit and scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, repeaters, and/or the like, sometimes referred to herein as a "network." Similarly, where a first computing device is described herein as sending data to a second computing device, it will be appreciated that the data may be sent or transmitted directly to the second computing device or may be sent or transmitted indirectly via one or more intermediary computing devices, such as, for example, one or more servers, remote servers, cloud-based servers (e.g., cloud utilities), relays, routers, network access points, base stations, hosts, repeaters, and/or the like.

In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The phrase 'one or more' includes a function being performed by one element, a function being performed by more than one element, e.g., in a distributed fashion, several functions being performed by one element, several functions being performed by several elements, or any combination of the above.

It will also be understood that, although the terms "first," "second," etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The phrases "in an embodiment," "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of. Furthermore, to the extent that the terms "includes" and "including," and variants thereof are used in either the detailed description or the claims, these terms are intended to be inclusive in a manner similar to the term "comprising."

As used herein, the term "computer-readable storage medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable storage medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random-access memory (such as, DRAM, SRAM, EDO RAM), and the like.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein can also include, for example, a baseband integrated circuit or applications processor integrated circuit for a mobile phone or a similar integrated circuit in a server, a cellular network device, other network device (such as a core network apparatus), field programmable gate array, and/or other computing device.

As described above, a plant, such as an industrial plant, and/or building containing a vast amount of assets may be complex such that fault detection techniques may need to be employed in order to monitor performance of the assets and/or issues (e.g., faults and/or failures) that may arise with one or more of the assets. In some examples, such fault detection techniques may include usage of models (e.g., machine learning models) trained on data associated with an asset such that the model(s) may detect an instance in which the asset exhibits abnormal behavior.

However, such models are often asset-specific and designed to capture linear relationships between variables associated with the monitoring of a particular asset. In this regard and with respect to a plant and/or building containing a large number of assets, a similar or equal number of models may need to be trained, deployed, and maintained in order to accurately diagnose one or more issues occurring in the plant and/or building, leading to an inefficient use of resources and additional, unwanted complexity to the system monitoring the plant and/or building.

To address these and/or other issues, a system, method, and non-transitory computer readable storage medium are disclosed herein that operate within an asset-agnostic framework providing a diagnostic capability that is adaptable to any asset type. In this regard, the system, method, and non-transitory computer readable storage medium integrate clustering analysis techniques and deep learning techniques further described herein to provide efficient anomaly detection for a plurality of assets that include various types of assets.

In this regard, a machine learning anomaly detection model, such as an autoencoder model, is trained based on historical data of a respective asset that has first undergone a clustering analysis, in some examples, that identifies data representing normal behavior of the respective asset. In this manner, the autoencoder model is trained such that a threshold of normal behavior for the respective asset and corresponding asset type is learned or otherwise identified. The trained autoencoder model may then determine whether real-time data associated with the respective asset, or another asset of a same or similar type, is anomalous such that the real-time data indicates a potential fault, failure, or other problem of the asset.

Referring now to FIG. 1, an example environment 100 within which embodiments disclosed herein may operate is illustrated. It will be appreciated that the environment 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of such an environment, numerous other configurations may also be employed.

In some embodiments, a diagnostic system 105 is configured to interact with one or more computing devices 102. In some embodiments, the computing device 102 is an administrative device, such as a computing device overseen by a system administrator, data engineer, and/or the like that is associated with an asset plant and/or building. Example computing devices 102 may include, without limitation, smart phones, tablet computers, laptop computers, wearables, personal computers, enterprise computers, and/or the like. In some embodiments, the diagnostic system 105 is configured to receive, generate, and cause transmission of data, such as one or more indications of potential faults of one or more assets, to the computing device(s) 102 (e.g., an administrative device).

In some embodiments, the diagnostic system 105 is configured to receive data associated with one or more assets 101A-101N. In some embodiments, the received data refers to data obtained by recording readings of one or more sensor devices configured to monitor one or more assets (e.g., a boiler, compressor, system, and/or other type of equipment or device). Examples of sensor devices whose readings are used to generate such data can include pressure (e.g., water pressure, air pressure, etc.) sensor devices, temperature sensor devices, motion sensor devices, environmental sensor devices, fan angular motion sensor devices, cameras, audio recorders, and/or the like. As one example, an asset such as a compressor may be associated with sensor devices monitoring data of the compressor. In this regard, example sensor devices that monitor data of the compressor may include a discharge temperature sensor, a discharge pressure sensor, a flow sensor, a suction drum level sensor, a suction temperature sensor, a suction pressure sensor, a control valve output sensor, a motor current sensor, a speed sensor, a motor temperature sensor, and/or the like.

The diagnostic system 105 may communicate with the computing device(s) 102 and/or the assets 101A-101N and/or associated sensor devices and/or other computing devices using a network 104. The network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the network 104 may include a cellular telephone, an 802.11, 802.16, 802.20, and/or WiMax network. Further, the network 104 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the system.

In some embodiments, the diagnostic system 105 can comprise clustering circuitry 111. In an embodiment, the clustering circuitry 111 can comprise one or more predefined functions, algorithms and/or instructions for performing clustering analysis on received sample data, such as for clustering data into one or more data clusters, determining a largest data cluster of the one or more data clusters, and/or the like. Additional details regarding the clustering circuitry 111 and the clustering of data is further described herein in connection with FIG. 3A.

In some embodiments, the diagnostic system 105 can comprise training circuitry 112. In an embodiment, the training circuitry 112 can comprise one or more predefined functions and/or instructions for processing clustered data to train a model, such as an autoencoder model, based at least on clustered data determined by the clustering circuitry 112, and/or the like. Additional details regarding the training circuitry 112 and the training of an autoencoder model is further described herein in connection with FIG. 6.

In some embodiments, the diagnostic system 105 can comprise data evaluation circuitry 113. In an embodiment, data evaluation circuitry 113 can comprise one or more predefined functions and/or commands for processing a plurality of data in accordance with a trained model, such as a trained autoencoder model to generate output data, and/or the like. Additional details regarding the data evaluation circuitry 113 and the clustering of data is further described herein in connection with FIGS. 4A and 5.

In some embodiments, the diagnostic system 105 includes or otherwise in communication with a storage subsystem 108. In some embodiments, the storage subsystem 108 is configured to store received data as well as one or more machine learning models (e.g., an autoencoder model) and data associated with the one or more machine learning models utilized by the diagnostic system 105, such as stored historical data. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Figure 2:
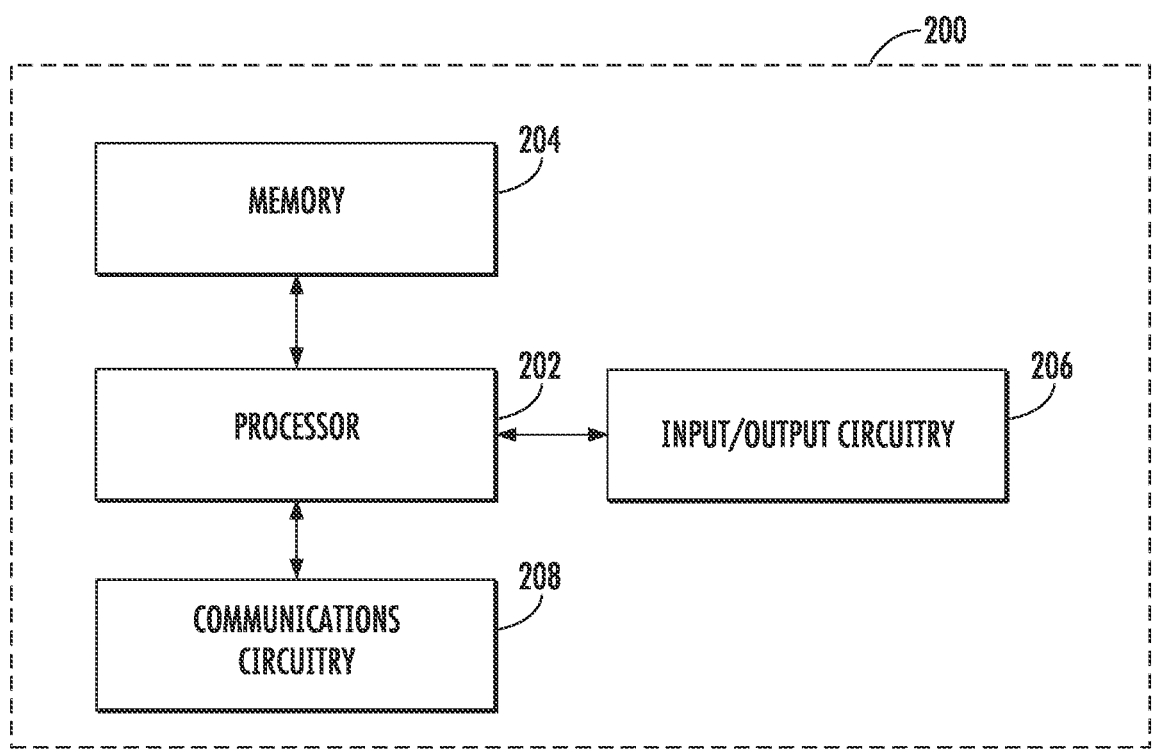
FIG. 2 illustrates a block diagram of an apparatus that may be specifically configured, in accordance with one or more embodiments described herein.

The diagnostic system 105 and/or the computing device(s) 102 may be embodied by one or more computing systems, such as the example apparatus 200 shown in FIG. 2. The apparatus 200 includes processor 202 and memory 204, and can include input/output circuitry 206 and communications circuitry 208. In some embodiments, the apparatus 200 may be configured to execute the operations described herein. Although these components 202-208 are described with respect to functional limitations, it should be understood that the particular implementations necessarily include the use of particular hardware. It should also be understood that certain of these components 202-208 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments disclosed herein.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204, storage subsystem 108, and/or circuitry otherwise accessible to the processor 202, such as the clustering circuitry 111, training circuitry 112, and/or the data evaluation circuitry 113. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment disclosed herein while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 can include input/output circuitry 206 that may, in turn, be in communication with processor 202 to provide output (e.g., to a user) and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 can be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communications circuitry 208 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Figure 3A:
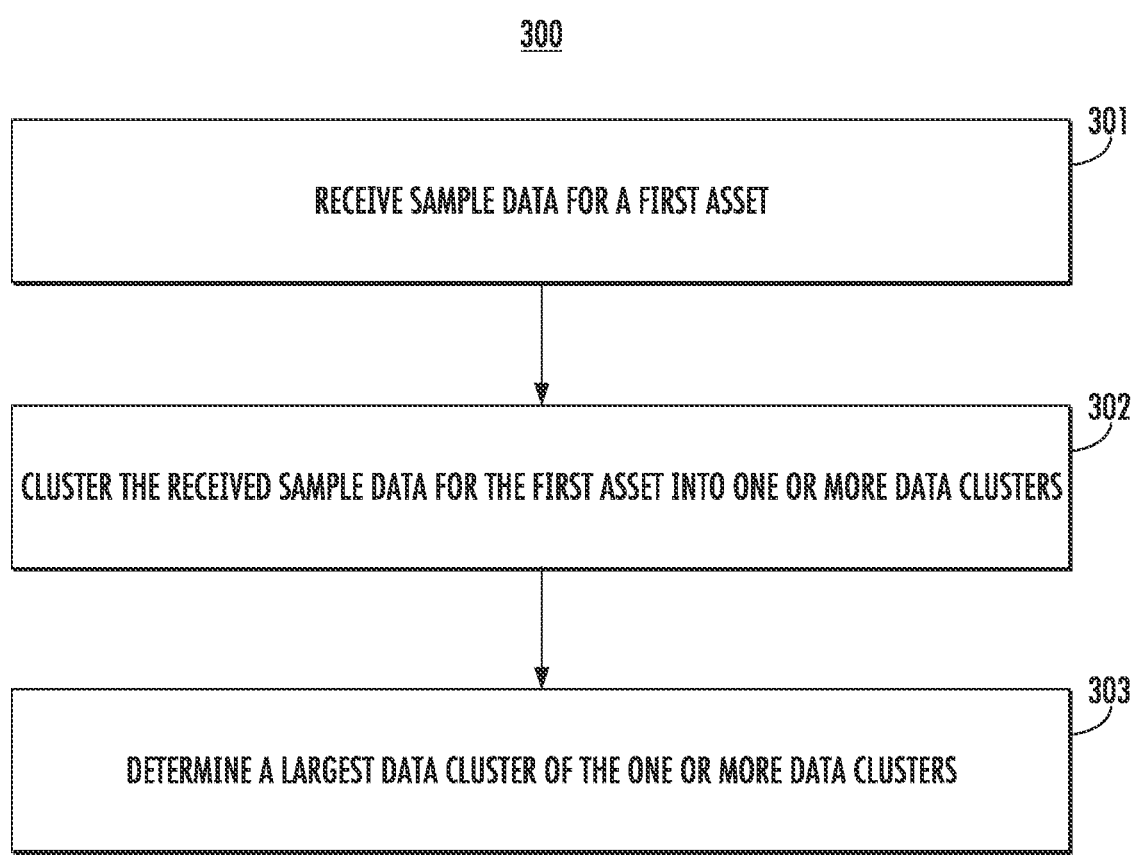
FIG. 3A illustrates a flow diagram of operations related to clustering received sample data, in accordance with one or more embodiments described herein.

Referring now to FIG. 3A, a method 300 illustrates operations of an example clustering analysis that is performed on received sample data for a respective asset in order to generate historical data for the respective asset. As described above, clustering techniques are performed in order to identify normal behavior of an asset, such that an autoencoder model can be trained based on the identified normal behavior (e.g., fault states and non-fault states) to accurately detect anomalous data associated with the asset.

At operation 301, the diagnostic system 105, such as the clustering circuitry 111, processor 202, communications circuitry 208, and/or the like, is configured to receive or otherwise access sample data for a first asset.

The sample data can be received or otherwise accessed from a variety of sources. For example, the sample data may be received (e.g., over network 104) from one or more sensor devices associated with the asset, such as temperature sensor devices, pressure sensor devices, oxygen sensor devices, and/or other types of sensor devices. In some examples, sample data may be received from an intermediary device between the sensor devices and the diagnostic system, such as a computing device associated with and/or embodied by the asset that is configured to monitor and/or control related sensor devices. In some examples, rather than being directly received from a source such as the asset, sensor device(s), and/or computing devices associated with the asset, the sample data may be received in an indirect manner, such as by way of input/output circuitry 206. In this regard, the sample data may be collected and processed, such as by a data engineer or the like, prior to being provided to the diagnostic system 105 for clustering.

Regardless of how the sample data is received, the sample data comprises data associated with an asset. For example, the sample data may comprise indications of one or more process level variables having values determined by sensors associated with the asset. For examples, such sensors may include, but are not limited to, temperature sensors, motion sensors, humidity sensors, smoke detectors, video cameras, audio recorders, vibration sensors, power meters, flow rate measurement sensors, gas sensors, radiation sensors, and/or other sensors. In this regard, the sample data may include data such as temperature readings, gas and/or pressure level readings, fan speed/spin rate, and/or the like. Continuing with the above example, sample data for a compressor may include process variables such as discharge temperature, discharge pressure, flow rate, suction drum level, suction temperature, suction pressure, control valve output readings, motor current, speed, motor temperature, and/or the like.

In some embodiments, the sample data may comprise time series data (e.g., a series of data points indexed according to time) sampled at a certain time interval. For example, the sample data may be data captured from one or more sensors associated with the asset over a specific period of time and at a particular sampling rate. As one non-limiting example, the sample data may comprise data captured from the one or more sensors every 15 minutes over a 72 hour period. As another non-limiting example, the sample data may include a large data set, wherein the sample data may comprise three years of data related to over 170 process variables.

In one or more embodiments, the sample data includes an asset identifier for the asset which the sample data relates to. The asset identifier can be a digital code such as, for example, a machine-readable code, a combination of numbers and/or letters, a string of bits, an asset tag number (e.g., an industrial equipment tag number), a digital label, or another type of identifier. The asset identifier facilitates identification of the asset. For instance, the asset identifier identifies a type of the asset (e.g., a boiler, an air conditioning unit, a compressor, etc.). In some embodiments, the asset identifier may include additional information such as, but not limited to, a description of the asset, a state of the asset, configuration information for the asset, maintenance history for the asset, and/or one or more settings related to the asset.

At operation 302, the diagnostic system 105, such as the clustering circuitry 111, processor 202, and/or the like, is configured to cluster the received sample data for the first asset into one or more data clusters.

Clustering the received sample data for the first asset can be performed in a variety of ways. For example, in some embodiments, the clustering of the received sample data is automatically performed in an unsupervised manner, such as by applying density-based clustering to process variables of the received sample data. By applying density-based clustering to the received sample data, clusters are defined as areas of a higher density of data points than the remainder of the data set, and a number of clusters can be automatically identified based on the density of data distribution. In this regard, data points within clusters are considered to represent normal operational conditions and/or behavior of the asset, or non-fault states, whereas outlier data points in sparse areas may be considered to be anomalous data, or representative of a fault state. It is to be appreciated that methods other than density-based clustering may be performed, such as, for example, K-Means clustering, agglomerative clustering, mean-shift clustering, spectral clustering, and/or the like.

By clustering the received sample data for the first asset in an unsupervised matter such as density-based clustering, normal operation conditions of the asset for the autoencoder model to be trained on may be efficiently identified without the need for manual intervention and/or feedback from a data engineer.

At operation 303, the diagnostic system 105, such as the clustering circuitry 111, processor 202, and/or the like, is configured to determine a largest data cluster of the one or more data clusters. For example, in some embodiments, the largest data cluster is automatically determined based on a cluster identified as containing the most data points of the one or more clusters. In this regard, the data points within the largest cluster represent normal operational conditions of the asset and be used to train the autoencoder model. The automatic unsupervised clustering and determination of a largest data cluster representing normal operational conditions of an asset provide technical improvements such as, but not limited to, fewer user inputs in that manual intervention by a data engineer and/or the like is not required, thus allowing the asset agnostic framework to operate autonomously.

Figure 6:
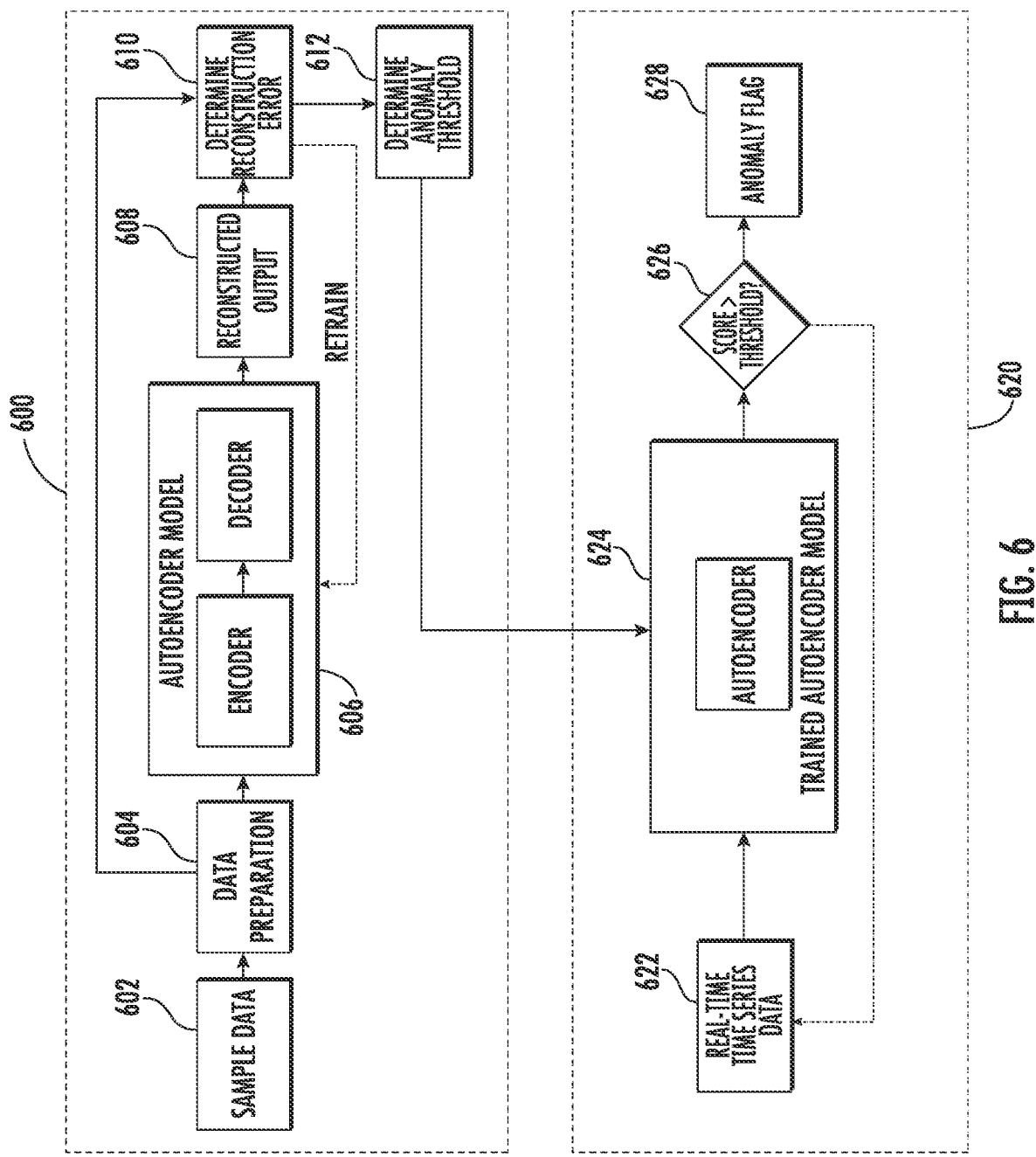
FIG. 6 illustrates a block diagram of an example model architecture, in accordance with one or more embodiments described herein.

Once the largest data cluster representing normal operational conditions of the asset has been determined, the autoencoder model can be trained using the largest data cluster. Turning briefly to FIG. 6, a block diagram of an example model architecture for an autoencoder model is illustrated. The example architecture is shown as operating in two stages, a training stage 600 and an inference stage 620.

During the training stage 600, sample data 602 (also referred to herein as historical data) may be provided as input. The sample data comprises the data points of the largest data cluster identified in operation 303 of FIG. 3A, as described above. In this regard, the clustered sample data may identify the normal operating conditions of a particular asset. In some embodiments, the sample data may also identify a type for the asset (e.g., a boiler, a compressor, etc.) as defined, for example, by an asset identifier as described above.

In some embodiments, the sample data may undergo a data preparation phase 604 for training the autoencoder model. The data preparation phase 604 may comprise chunking of the sample data and/or splitting of the sample data into batches for training. As one example, clustered sample data comprising data for three continuous days sampled at one-minute intervals for 70 process variables comprises 4,320 data points. After chunking of the clustered sample data, the number of samples may be represented by 24×180×70, read as 24 samples by 180 time steps in each sample for 70 process variables. In some embodiments, samples may be divided into batches of equal length for training.

The sample data may then be provided to the autoencoder model 606 for training. The autoencoder model is a type of artificial neural network used to learn the normal operational behavior of asset(s) in an unsupervised manner. The autoencoder model comprises an encoder and a decoder, with one exemplary goal of the autoencoder being to learn a representation (e.g., an encoding or compression) for the sample data, for dimensionality reduction, by training the autoencoder 606 to ignore signal noise through use of an encoder. In this regard, representing data in a lower-dimensional space can improve performance on different tasks, such as classification. Along with the reduction, a reconstruction is learned (e.g., decoding or decompression), wherein the autoencoder generates, from the reduced encoding, a reconstructed output 608. The reconstructed output 608 is a representation intended to be as close as possible to the original input sample data.

Once the reconstructed output 608 is generated, a reconstruction error 610 is determined. As shown by the method 310 in FIG. 3B, at operation 311, the diagnostic system 105, such as the training circuitry 112, processor 202, and/or the like, is configured to determine a reconstruction error for the historical data based at least on a compression and a decompression (e.g., the encoding and decoding described above) of the historical data. In this regard, the determined reconstruction error is used as an evaluation metric. As described above, the autoencoder model is to learn what normal operational conditions are for the asset, such that the model should be able to reconstruct the input sequence. In some embodiments, as shown in FIG. 6, the reconstruction error is a value based on the difference between the original sample data (e.g., the prepared sample data 604) and the reconstructed output 608. In some embodiments, the reconstruction error may be based on an average of determined reconstruction errors for each process variable across different time steps. At operation 312, the diagnostic system 105, such as the training circuitry 112, processor 202, and/or the like, is configured to determine, based at least on a reconstruction error of the historical data, an anomaly threshold for the first asset. The determined anomaly threshold 612 represents the threshold of normal operational conditions for the asset. For example, the anomaly threshold can be a value (e.g., a value between 0 and 1) that defines a threshold which data associated with an anomaly score (described further herein) under the threshold is classified as exhibiting normal asset behavior and data associated with an anomaly score over the threshold is classified as exhibiting abnormal asset behavior. In some embodiments, the anomaly threshold may be determined based on a calculation of $$\text{anomaly threshold} = R + \alpha * \sigma$$

wherein R represents the reconstruction error, (e.g., the average of determined reconstruction errors for each process variable as described above), σ represents a variance of the re-construction error, and α represents a multiplier that may be determined based on reconstruction errors from non-fault clusters from training data that minimize false positives.

The automatic unsupervised learning of normal operational conditions of an asset by the autoencoder model provides technical improvements such as, but not limited to, fewer user inputs in that the model may learn behaviors of the asset autonomously using sample data without manual intervention, such as a data engineer having to define normal behavior for the asset or the like.

During the training stage 600, the autoencoder model may continuously be provided with sample data for the asset (as well as other assets) such that the autoencoder model may continue to learn behavior of the asset and/or adjust the anomaly threshold associated with the asset. In some instances, based on a determined reconstruction error, retraining of the autoencoder model may be necessary. For example, a reconstruction error determined during a phase of training may indicate a dimensionality of the reconstructed output 608 differing substantially from the original sample data 604. In this regard, the reconstruction error may meet or exceed a predefined threshold value, indicating that the reconstruction error is too large and retraining and/or recalibration of the anomaly threshold (e.g., additional collection of sample data) is needed in order to accurately reflect normal operational conditions of the asset. In this regard, a determination as to whether retraining is needed may be performed automatically by comparing the reconstruction error to a predefined threshold value. In some embodiments, re-training may be initiated manually, e.g., by a process engineer and/or the like, after it is determined that the autoencoder model is experiencing a data drift (e.g., a change in normal operating conditions over time).

After training the autoencoder model such that the anomaly threshold for the asset is learned, the trained autoencoder model 624 may operate in an inference stage 620, wherein real-time data 622 associated with the asset is processed to determine whether the asset is exhibiting abnormal operational conditions that may indicate a potential fault of the asset.

Figure 4A:
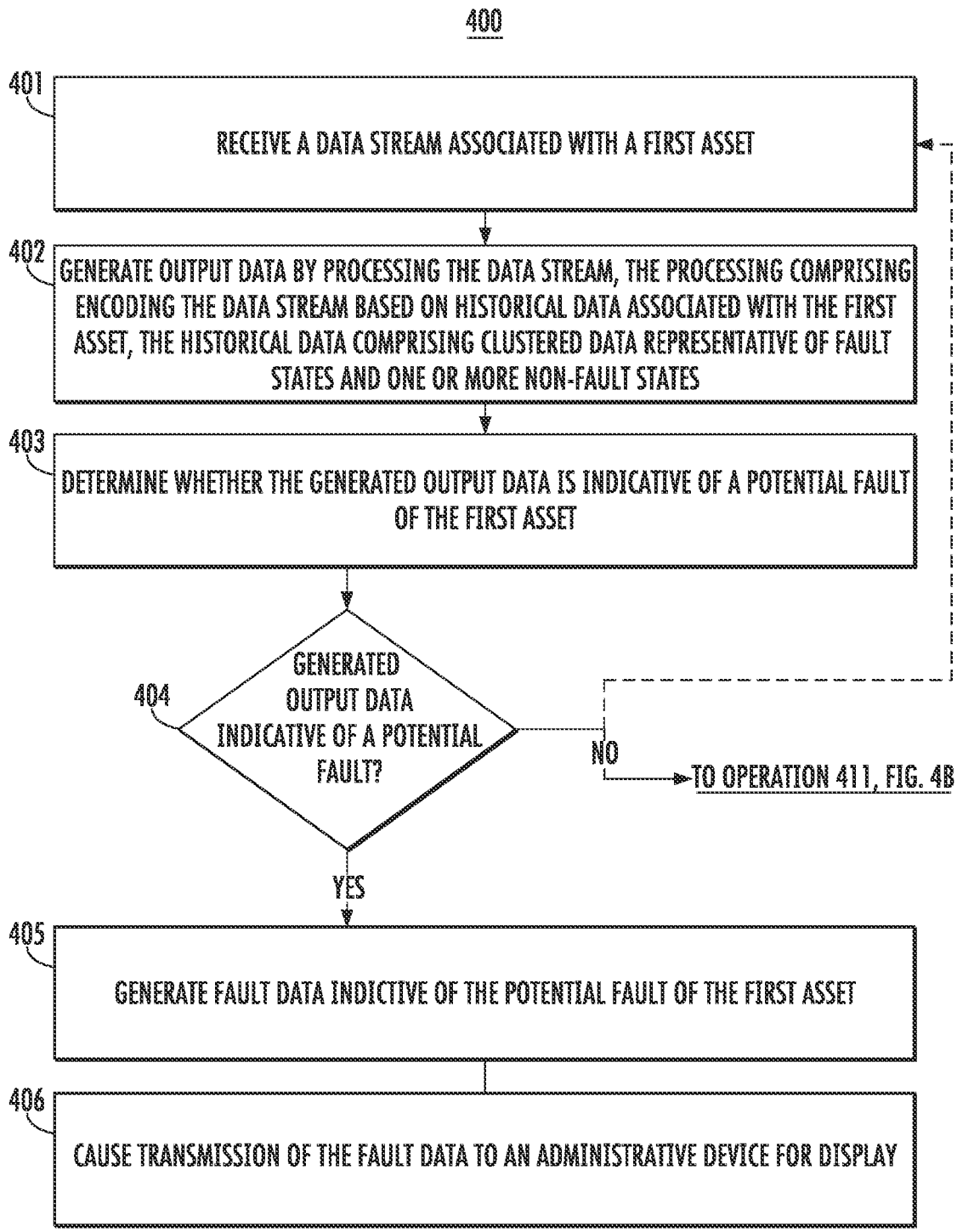
FIG. 4A illustrates a flow diagram of operations related to determining whether a received data stream relates to a potential fault of an asset, in accordance with one or more embodiments described herein.

Turning to FIG. 4A, a method 400 related to determining whether a received data stream relates to a potential fault of an asset is illustrated.

At operation 401, the diagnostic system 105, such as the data evaluation circuitry 113, processor 202, communications circuitry 208 and/or the like, is configured to receive a data stream associated with a first asset. The received data stream can comprise real-time data (or near real-time data), for example, real-time data received from one or more sensors associated with the first asset. In this regard, the received data stream can comprise real-time data such that the data is indicative of the current state of the first asset and comprise measurements, readings, and/or the like that the asset is currently experiencing, producing, and/or the like.

For example, the data stream may be received (e.g., over network 104) from one or more sensor devices associated with the asset, such as temperature sensors, pressure sensors, oxygen sensors, and/or other types of sensors. In some examples, the data stream may be received from an intermediary device between the sensors and the diagnostic system, such as a computing device associated with and/or embodied by the asset that is configured to monitor and/or control the related sensor devices.

The data stream comprises data associated with an asset. For example, the data stream may comprise values for one or more process level variables determined by the sensors associated with the asset. In this regard, the data stream may include data such as temperature readings, gas and/or pressure level readings, fan speed/spin rate recordings, and/or the like.

In some embodiments, the data stream may comprise real-time data and time series data sampled at a certain time interval. For example, the data stream may be data captured from one or more sensors associated with the asset over a specific period of time and at a particular sampling rate, such as, for example, every minute over the previous hour.

In some embodiments, the data stream may be received based on a schedule. For example, the diagnostic system 105 may be configured to receive data streams associated with one or more assets periodically in order to monitor and diagnose the assets accordingly. The data stream may also comprise an asset identifier as described above, such that an asset type is provided with the data stream.

At operation 402, the diagnostic system 105, such as the data evaluation circuitry 113, processor 202, communications circuitry 208 and/or the like, is configured to generate output data by processing the data stream, with the processing comprising encoding the data stream based on historical data associated with the first asset, and the historical data comprising clustered data representative of fault states and one or more non-fault states, for example, the sample data used to train the autoencoder model on the normal operating conditions of the asset, as described above.

In this regard, the data stream is processed by providing the data stream to the trained autoencoder model, which encodes the data stream to generate output data. In some embodiments, the generated output data is an anomaly score for the data stream. For example, based on historical data for the asset, such as the clustered sample data used to train the autoencoder on the normal behavior of the asset, the data stream is processed such that an anomaly score is determined for the data stream.

In some embodiments, the generated anomaly score is a value indicative of how likely it is that the data stream is exhibiting anomalous behavior that may be indicative of a fault. For example, the generated anomaly score can be a value between 0 and 1, with an anomaly score closer to 1 indicating that the asset is more likely to be experiencing a fault and an anomaly score closer to 0 indicating that the asset is less likely to be experiencing a fault. The automatic generation of output data by processing the data stream by encoding the data stream based on historical clustered data provides technical improvements such as, but not limited to, improving efficiency and extending functionality in that historical data for a plurality of assets may be clustered and learned by the autoencoder model, thus allowing the model to diagnose potential faults for a plurality of assets of different types.

After generating the output data (e.g., the anomaly score), at operation 403, the diagnostic system 105, such as the data evaluation circuitry 113, processor 202, and/or the like, is configured to determine whether the generated output data is indicative of a potential fault of the first asset. In this regard, the diagnostic system 105, such as the data evaluation circuitry 113, processor 202, and/or the like, is configured to determine whether the anomaly score for the received data stream exceeds the anomaly threshold for the asset. As the anomaly threshold 612 represents the threshold of normal operational conditions for the asset, an anomaly score exceeding the anomaly threshold indicates a potential fault of the asset.

At decision point 404, and as illustrated in block 626 of FIG. 6, in accordance with the determining that the generated output data (e.g., the anomaly score) is indicative of a potential fault of the first asset (e.g., the anomaly score meets or exceeds the anomaly threshold), the method 400 continues to operation 405, wherein the diagnostic system 105, such as the data evaluation circuitry 113, processor 202, communications circuitry 208 and/or the like, is configured to generate fault data indicative of the potential fault of the first asset.

In this regard, in some embodiments, fault data is generated that provides an indication that the received data stream is exhibiting behavior of a potential fault. In some embodiments, the fault data may be generated such that the fault data is configured to be rendered, e.g., to a graphical user interface, such that the fault data may be reviewed by a data engineer, system administrator, and/or the like. In this regard, at operation 406, the diagnostic system 105, such as the communications circuitry 208, processor 202, and/or the like, is configured to cause transmission of the fault data to an administrative device for display. The generation and transmission of fault data provides technical improvements such as, but not limited to, facilitating presentation of a particular type information via an electronic interface, and/ or facilitating how to present the particular type of information via an electronic interface.

In some embodiments, the fault data includes an indication of an anomaly flag 628, which may comprise a Boolean value of 'True' indicating that the data stream is indicative of a potential fault of the asset. In some embodiments, the fault data may be further indicative of the anomaly score and the anomaly threshold for the asset. In this regard, a data engineer reviewing the fault data can review the generated anomaly score in comparison to the anomaly threshold. Further, in some embodiments, the fault data may also comprise indications at least a portion of the data stream. For example, the fault data may comprise indications of some or all of the process variables and associated values of the data stream for evaluation, e.g., by a data engineer and/or the like.

Returning to decision point 404, in accordance with determining that the generated output data is not indicative of a potential fault of the first asset (e.g., the anomaly score is less than the anomaly threshold), in some embodiments, the method may return to operation 401 and await reception of another data stream to process. In this regard, in instances in which the received data stream indicates that the asset is functioning normally, it may not be necessary to cause transmission of data to a data engineer and instead only cause transmission of the data in instance in which potential faults are detected.

Figure 4B:
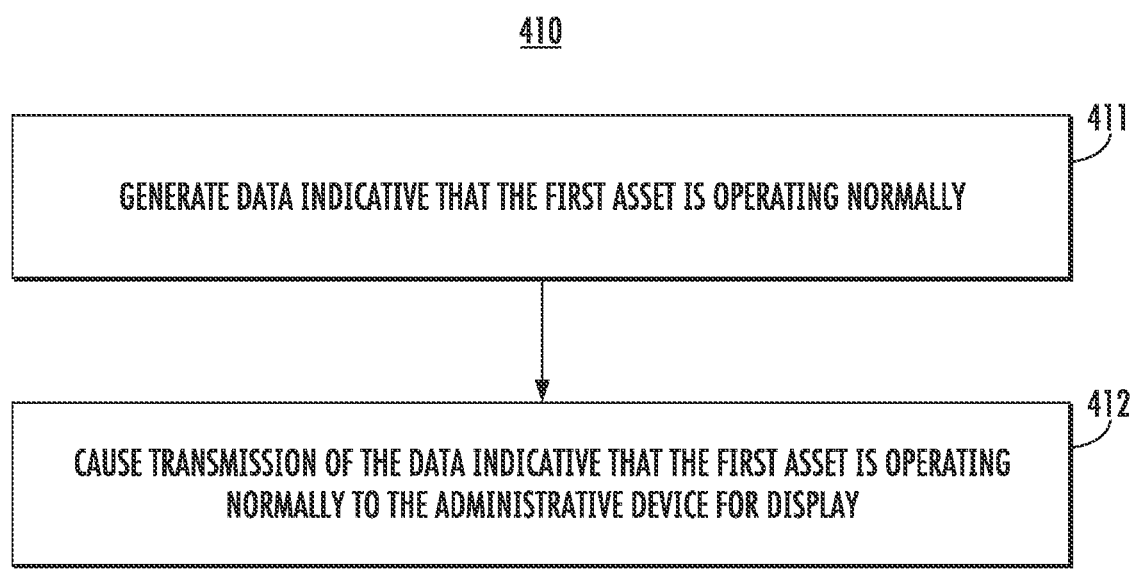
FIG. 4B illustrates a flow diagram of operations performed in accordance with a determination that generated output data is not indicative of a potential fault, in accordance with one or more embodiments described herein.

However, in some embodiments, the method 400 may continue to method 410 of FIG. 4B, wherein at operation 411, in accordance with determining that the generated output data is not indicative of a potential fault of the first asset, the diagnostic system 105, such as the data evaluation circuitry 113, processor 202, and/or the like, is configured to generate data indicative that the first asset is operating normally.

In some embodiments, the data indicative that the first asset is operating normally includes an indication of an anomaly flag 628, which may comprise a Boolean value of 'False' indicating that the data stream is not indicative of a potential fault of the asset. In some embodiments, the data indicative that the first asset is operating normally may be further indicative of the anomaly score and the anomaly threshold for the asset. In this regard, a data engineer reviewing the data can review the generated anomaly score in comparison to the anomaly threshold. Further, in some embodiments, the data may also comprise indications at least a portion of the data stream. For example, the data may comprise indications of some or all of the process variables and associated values of the data stream for evaluation, e.g., by a data engineer and/or the like. The generation and transmission of data indicative that the first asset is operating normally provides technical improvements such as, but not limited to, facilitating presentation of a particular type information via an electronic interface, and/or facilitating how to present the particular type of information via an electronic interface.

At operation 412, the diagnostic system 105, such as the processor 202, communications circuitry, and/or the like, is configured to cause transmission of the data indicative that the first asset is operating normally to the administrative device (e.g., computing device 102) for display.

In some examples, the diagnostic system 105 may advantageously utilize historical data for a first asset in order to determine whether a second asset having a same asset type of the first asset is exhibiting behavior of a potential fault. For example, machine learning anomaly detection models, may, in some examples, suffer disadvantages in the form of a cold-start problem. For example, a newly operational and/or connected asset to a plant and/or building may lack a history of data to properly cluster and train the autoencoder model and/or otherwise base any detection of potential faults on. With a lack of historical data for the asset to train the autoencoder model, the model may function in an undesired manner when attempting to process a received data stream associated with the asset. In this regard, due to a lack of initial insights and validation metrics, training the model towards an optimal solution may result in inaccuracies and unusual results. In other words, without an initial amount of data (e.g., sample data as described above), anomaly detection processes may be inaccurate, at least during an initial cold-start period in which the asset is operating. In this regard, it may be difficult to evaluate newly operational and/or connected assets in some examples.

Figure 5:
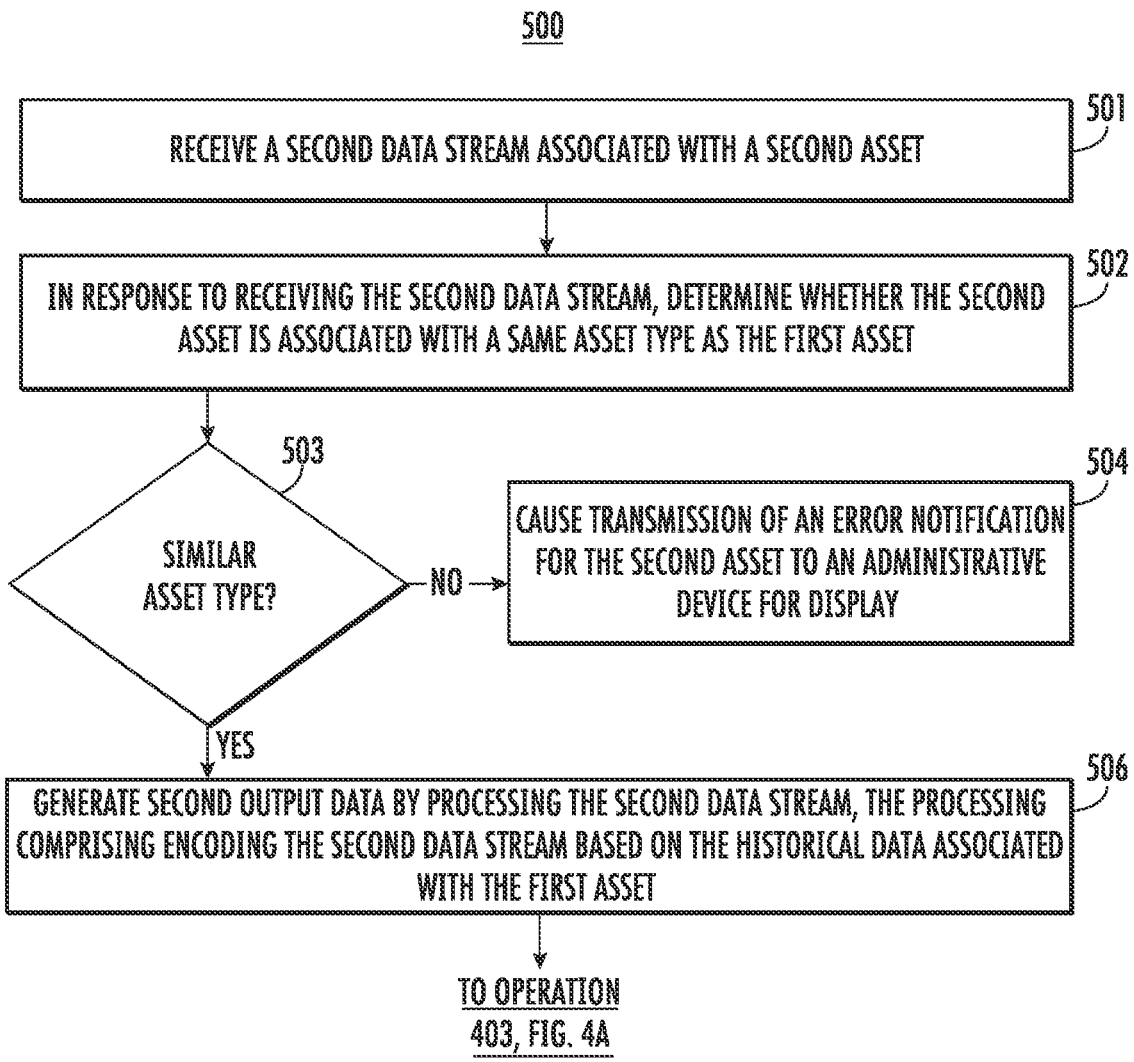
FIG. 5 illustrates a flow diagram of operations performed in accordance with a determination of whether historical data for an asset exceeds a predefined historical data threshold, in accordance with one or more embodiments described herein.

However, by leveraging historical data of another asset in the plant and/or building having a same asset type as the newly operational and/or connected asset, a solution is provided to alleviate the potential inaccurate and/or misleading data that may be generated during the cold-start period for the newly operational and/or connected asset. To illustrate, FIG. 5 depicts a method 500 of operations performed in accordance with a determination of whether historical data for an asset exceeds a predefined historical data threshold.

Beginning at operation 501, the diagnostic system 105, such as the processor 202, communications circuitry 208, and/or the like, is configured to receive a second data stream associated with a second asset.

Similar to the data stream described above with respect to operation 401 of FIG. 4A, the received second data stream may comprise real-time data, for example, real-time data received from one or more sensors associated with the second asset. The received second data stream may comprise real-time data such that the data is indicative of the current state of the asset and comprise measurements, readings, and/or the like that the asset is currently experiencing, producing, and/or the like. Additionally, in some embodiments, the second data stream may also comprise an asset identifier as described above, such that an asset type is provided with the data stream that indicates the asset type of the second asset.

At operation 502, the diagnostic system 105, such as the processor 202, communications circuitry, and/or the like, is configured to, in response to receiving the second data stream, determine whether the second asset is associated with a same asset type as the first asset.

For example, an asset may be determined to have a same asset type as another asset based on the asset identifiers comprising an indication of the same asset type (e.g., a first compressor and a second compressor may be associated with a respective asset identifier indicating "compressor" as the asset type). In some embodiments, the determination as to whether the second asset is associated with a same asset type as the first asset and/or the autoencoder model trained on data associated with the first asset can be used to detect anomalies of the second asset is based on an overlap of process variables associated with the first and second assets. For example, historical data, such as sample data including process variables for the first asset that has been clustered and used to train the autoencoder model to learn the normal operational conditions of the asset, can be stored, for example, in storage subsystem 108, memory 204, and/or the like. In this regard, stored historical data is accessed and compared to the received second data stream. If the historical data and the second data stream share a predefined amount of process variables in common, it can be determined that the first and second assets share a same (or similar) asset type. For example, a first asset being a compressor and a second asset being a generator may share common process variables such that the autoencoder model trained on the normal behavior of the compressor can be used to predict faults associated with the generator. As another example, a first asset being a compressor and a second asset being a boiler may not share enough process variables in common such that a determination is made that the assets are different types, and training of the model on data associated with the boiler is needed.

At decision point 503, the diagnostic system 105, such as the data evaluation circuitry 113, processor 202, communications circuitry 208 and/or the like, is configured to determine whether an asset having the same asset type of the second asset is associated with the second asset.

In this regard, the learned behavior of the autoencoder model including the historical data and the anomaly threshold for the first asset may be used for processing the second data stream for the second asset to identify abnormal behavior and/or potential faults of the second asset.

In some embodiments, in accordance with determining that the second asset is associated with a different asset type than the asset type on which the autoencoder model has been trained (e.g., the asset plant and/or building includes no assets of the same type as the second asset), the method 500 continues to operation 504, wherein the diagnostic system 105, such as the processor 202, communications circuitry 208, and/or the like, is configured to cause transmission of an error notification for the second asset to an administrative device for display. For example, the error notification may comprise indications that the second asset is a unique asset type to the plant and/or building, and that additional training and/or retraining of the autoencoder model is required in order to accurately process data streams associated with the second asset. In this regard, the process may restart at operation 301 of method 300 in which sample data is collected for the second asset in order to retrain the autoencoder model accordingly.

In some embodiments, in accordance with determining that the second asset is associated with the same asset type as the first asset (e.g., the asset plant and/or building includes an asset of the same type as the second asset), the method 500 continues to operation 506, wherein the diagnostic system 105, such as the processor 202, data evaluation circuitry 113, and/or the like, is configured to generate second output data by processing the second data stream, the processing comprising encoding the second data stream based on the historical data associated with the first asset.

In this regard, similar to operation 402 as described above, the second data stream is processed by providing the data second stream to the trained autoencoder model, which in turn encodes the data stream to generate output data. In some embodiments, as described above, the output data is an anomaly score for the data stream. For example, based on historical data for the first asset, such as the clustered sample data used to train the autoencoder on the normal behavior of the first asset, the second data stream for the second asset is processed such that an anomaly score may be determined for the second data stream. In this manner, learned behavior of assets may be utilized for newly operational and/or connected assets lacking a history of behavioral data in order to avoid cold-start period anomaly detection inaccuracies for the newly operations and/or connected assets.

The method 500 may then continue to operation 403 of FIG. 4A and continue to perform operations 404-406 or 411-412 of FIG. 4B, with respect to the second asset.

In some example embodiments, certain ones of the operations herein can be modified or further amplified as described below. Moreover, in some embodiments additional optional operations can also be included. It should be appreciated that each of the modifications, optional additions or amplifications described herein can be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

What is claimed is:

1. A system, comprising:
a processor; and
a memory that stores executable instructions that, when executed by the processor, cause the processor to:
receive a data stream associated with a first asset;
generate output data by processing the data stream, the processing comprising encoding the data stream utilizing an encoder configured based on historical data associated with the first asset, the historical data determined as stored corresponding to at least one process variable associated with the first asset, the historical data comprising clustered data representative of fault states and one or more non-fault states;
determine whether the output data is indicative of a potential fault of the first asset; and
in accordance with determining that the data is indicative of a potential fault of the first asset:
generate fault data indicative of the potential fault of the first asset; and
cause transmission of the fault data to an administrative device for display.

2. The system of claim 1, the executable instructions, when executed by the processor, further causing the processor to:
generate the historical data by processing received sample data for the first asset, the processing comprising:
clustering the received sample data for the first asset into one or more data clusters; and
determining a largest data cluster of the one or more data clusters, the historical data being based on the largest data cluster.

3. The system of claim 1, the executable instructions, when executed by the processor, further causing the processor to:
receive a second data stream associated with a second asset;
in response to receiving the second data stream, determine whether the second asset is associated a same asset type as the first asset; and
in accordance with determining that the second asset is associated with the same asset type as the first asset:
generate a second output data by processing the second data stream, wherein encoding the second data stream is based on the historical data associated with the first asset.

4. The system of claim 3, the executable instructions, when executed by the processor, further causing the processor to, in accordance with a determination that the second output data is indicative of a potential fault of the second asset:
generate second fault data indicative of the potential fault of the second asset; and
cause transmission of the second fault data to the administrative device for display.

5. The system of claim 1, the executable instructions, when executed by the processor, further causing the processor to:
determine a reconstruction error for the historical data based at least on a reconstructed representation of the historical data; and
determine, based at least on a reconstruction error of the historical data, an anomaly threshold for the first asset.

6. The system of claim 5, the executable instructions, when executed by the processor, further causing the processor to:
determine whether the output data exceeds the anomaly threshold,
the output data being determined to be indicative of the potential fault of the first asset in accordance with determining that the output data exceeds the anomaly threshold.

7. The system of claim 1, the executable instructions, when executed by the processor, further causing the processor to, in accordance with determining that the output data is not indicative of a potential fault of the first asset:
generate data indicative that the first asset is operating normally; and
cause transmission of the data indicative that the first asset is operating normally to the administrative device for display.

8. The system of claim 5, the fault data or the data indicative that the first asset is operating normally being further indicative of the anomaly threshold.

9. The system of claim 1, wherein the historical data comprises a plurality of historical data portions associated with a plurality of distinct assets, the plurality of assets each associated with the at least one process variable.

10. The system of claim 1, wherein the encoder is updated based at least in part on continuously received sample data from at least one asset.

11. A method, comprising:
receiving a data stream associated with a first asset;
generating output data by processing the data stream, the processing comprising encoding the data stream utilizing an encoder configured based on historical data associated with the first asset, the historical data determined as stored corresponding to at least one process variable associated with the first asset, the historical data comprising clustered data representative of fault states and one or more non-fault states;
determining whether the output data is indicative of a potential fault of the first asset; and
in accordance with determining that the data is indicative of a potential fault of the first asset:
generating fault data indicative of the potential fault of the first asset; and
causing transmission of the fault data to an administrative device for display.

12. The method of claim 11, further comprising:
generating the historical data by processing received sample data for the first asset, the processing comprising:
clustering the received sample data for the first asset into one or more data clusters; and
determining a largest data cluster of the one or more data clusters, the historical data being based on the largest data cluster.

13. The method of claim 11, further comprising:
receiving a second data stream associated with a second asset;
in response to receiving the second data stream, determining whether the second asset is associated with a same asset type as the first asset; and
in accordance with determining that the second asset is associated with the same asset type as the first asset:
generating a second output data by processing the second data stream, wherein encoding the second data stream is based on the historical data associated with the first asset.

14. The method of claim 13, further comprising, in accordance with a determination that the second output data is indicative of a potential fault of the second asset:
generating second fault data indicative of the potential fault of the second asset; and
causing transmission of the second fault data to the administrative device for display.

15. The method of 11, further comprising:
determining a reconstruction error for the historical data based at least on a compression and a decompression of the historical data; and
determining, based at least on a reconstruction error of the historical data, an anomaly threshold for the first asset.

16. The method of claim 15, further comprising:
determining whether the output data exceeds the anomaly threshold,
the output data being determined to be indicative of the potential fault of the first asset in accordance with determining that the output data exceeds the anomaly threshold.

17. The method of claim 11, further comprising, in accordance with determining that the output data is not indicative of a potential fault of the first asset:
generating data indicative that the first asset is operating normally; and
causing transmission of the data indicative that the first asset is operating normally to the administrative device for display.

18. The method of claim 15, the fault data or the data indicative that the first asset is operating normally being further indicative of the anomaly threshold.

19. A non-transitory computer-readable storage medium comprising one or more programs for execution by one or more processors of a first device, the one or more programs including instructions which, when executed by the one or more processors, cause the device to:
receive a data stream associated with a first asset;
generate output data by processing the data stream, the processing comprising encoding the data stream based on historical data associated with the first asset, the historical data comprising clustered data representative of fault states and one or more non-fault states;
determine whether the output data is indicative of a potential fault of the first asset; and
in accordance with determining that the output data is indicative of a potential fault of the first asset:
generate fault data indicative of the potential fault of the first asset; and
cause transmission of the fault data to an administrative device for display.

20. The non-transitory computer-readable storage medium of claim 19, the instructions, when executed by the one or more processors, further causing the device to:
generate the historical data by processing received sample data for the first asset, the processing comprising:
clustering the received sample data for the first asset into one or more data clusters; and
determining a largest data cluster of the one or more data clusters, the historical data being based on the largest data cluster.

21. The non-transitory computer-readable storage medium of claim 19, the instructions, when executed by the one or more processors, further causing the device to:
receive a second data stream associated with a second asset;
in response to receiving the second data stream, determine whether the second asset is associated with a same asset type as the first asset; and
in accordance with determining that the second asset is associated with the same asset type as the first asset:
generate a second output data by processing the second data stream, wherein encoding the second data stream based on the historical data associated with the first asset.

22. The non-transitory computer-readable storage medium of claim 21, the instructions, when executed by the one or more processors, further causing the device to, in accordance with a determination that the second output data is indicative of a potential fault of the second asset:
generate second fault data indicative of the potential fault of the second asset; and
cause transmission of the second fault data to the administrative device for display.

23. The non-transitory computer-readable storage medium of claim 19, the instructions, when executed by the one or more processors, further causing the device to:
determine a reconstruction error for the historical data based at least on a compression and a decompression of the historical data; and
determine, based at least on a reconstruction error of the historical data, an anomaly threshold for the first asset.

24. The non-transitory computer-readable storage medium of claim 23, the instructions, when executed by the one or more processors, further causing the device to:
determine whether the output data exceeds the anomaly threshold,
the output data being determined to be indicative of the potential fault of the first asset in accordance with determining that the output data exceeds the anomaly threshold.

* * * * *